March 6, 1962 T. C. HOLKA ETAL 3,023,535
LEADER CONNECTOR FOR FISH LINE
Filed Nov. 26, 1958
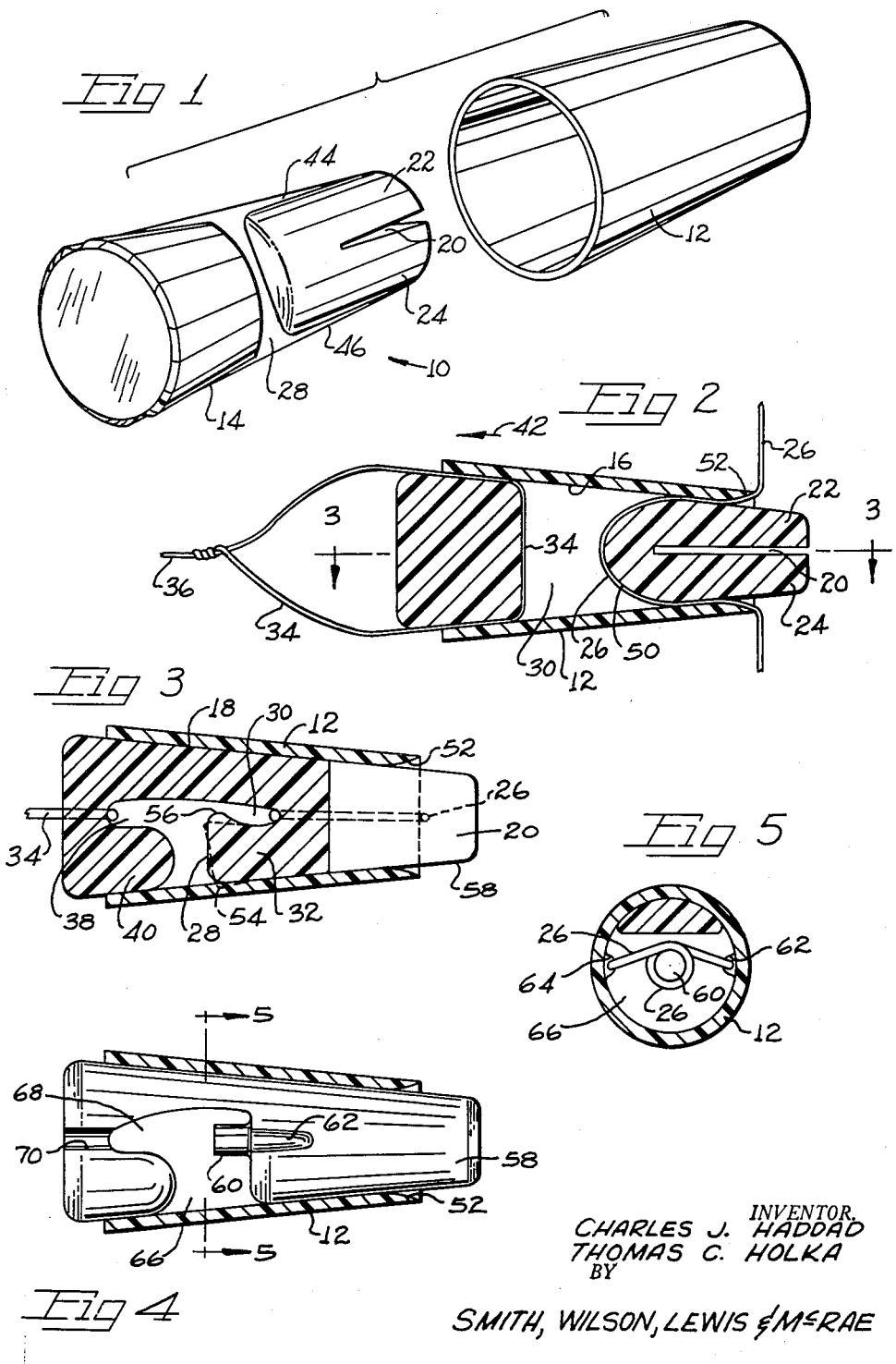
INVENTOR.
CHARLES J. HADDAD
THOMAS C. HOLKA
BY
SMITH, WILSON, LEWIS & McRAE

3,023,535
LEADER CONNECTOR FOR FISH LINE
Thomas C. Holka, 7581 Dobel, and Charles J. Haddad,
151 Cedarhurst, both of Detroit, Mich.
Filed Nov. 26, 1958, Ser. No. 776,594
3 Claims. (Cl. 43—43.1)

This invention relates to a device for connecting a fish hook leader to a desired portion of a fish line, the device being particularly characterized by low cost, easy manual manipulation for leader-removal purposes, and interchangeable use with lines of different diameters.

In the art of fishing the fish line is provided with a sinker for causing it to gravitate toward the lake bottom, the portion of the line just above the sinker having connected therewith a leader provided with a hook, the arrangement being such that one, two or more leaders are extended from the line at different positions therealong. Generally, the leaders are connected onto the line merely by tying a portion of the line around a looped end portion of the leader, the resulting connection being permanent and being disconnected only by cutting the line to remove the leader.

It is of course desirable that the leader be easily removable from the line for storage purposes, it being appreciated that lines can more easily and safely be stored if the hook-carrying leaders are removed therefrom, the hooks thereof serving to become entangled in the lines so as to prevent orderly storage.

Removal of the leader from the line is also desirable for leader-repositionment purposes, since the fisherman very often desires to change the position of the fish hook relative to the lake bottom in accordance with fishing conditions and the success of other fishermen with different arrangements.

From the above description it will be seen that very decided advantages are attained by a device for connecting the leader to the fish line in a quickly removable manner, particularly such a device which does not require cutting of the line.

Accordingly, a primary object of the present invention is to provide a line-leader connector which may be easily manipulated to quickly remove the leader from the line whenever desired.

Another object of the invention is to provide a line-leader connector which may be utilized at any point along the fish line without slipping thereon and without weakening of the line, as by knots or sharp kinks in the line.

Another object of the invention is to provide a line-leader connector which holds the leader in a position extending right angularly from the line, said right angularly extending position being considered the most advantageous because of the "anti-tangling" action which is thereby achieved.

Another object of the invention is to provide a line-leader connector which is of simple construction and low cost manufacture, the design of the device being such that normal tolerance variations will not substantially affect operability of the device.

Another object of the invention is to provide a line-leader connector which may be constructed as a very small two piece assembly so as to conserve on materials and thereby lower the cost of the device.

Another object of the invention is to provide a line-leader connector of simple two piece construction, characterized by an ability to be retained on a desired portion of the line while permitting quick, easy removal of a leader.

Other objects of this invention will appear in the following description and appended claims, reference being had to the accompanying drawings forming a part of this specification wherein like reference characters designate corresponding parts in the several views.

In the drawings:

FIG. 1 is a perspective view of a two piece line-leader connector constructed according to the invention, the two pieces being shown in separated positions, FIG. 2 is a sectional view through the FIG. 1 embodiment, with the pieces thereof being installed on one another to interconnect a leader and fish line.

FIG. 3 is a sectional view taken substantially on line 3—3 in FIG. 2,

FIG. 4 is a view substantially similar to FIG. 2 but of a second embodiment of the invention, the internal plug member of the FIG. 4 unit being shown in elevation for illustration purposes, FIG. 5 is a sectional view taken on line 5—5 in FIG. 4, but with a fish line installed therein.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, and particularly FIGS. 1 through 3 there is shown a two piece line-leader connector assembly 10 comprising a female portion 12 formed as a sleeve, and a male portion 14 formed as a plug, both of said portions 12 and 14 being preferably formed of nylon or other plastic material having a slight resiliency such as to permit of their frictional retention together.

Sleeve 12 is provided with a tapering internal surface 16, and plug 14 is provided with a tapering external surface 18 for frictionally releasably retaining the plug within the sleeve as shown in FIG. 2. The taper of surfaces 16 and 18 may be the same or slightly different while still retaining a wedging action such as to provide the frictional interlock. The frictional interfitting of parts is also promoted by the formation of one or more slits 20 in plug 14, each slit forming two spring leg portions 22 and 24 which are slightly compressed together as the plug is forced into the sleeve so as to develop a stress therein tending to urge the leg portions apart into resilient frictional engagement with the surface 16.

Prior to insertion of plug 14 into sleeve 16 the plug is positioned adjacent a fish line 26, with the line being inserted into the body of the plug through a narrow entrance opening 28 (FIG. 3) leading to an elongated notch-forming slot 30, said slot defining a shoulder 32 for preventing the line from working out of the plug from its looped position shown in FIGS. 2 and 3. It will be appreciated that entrance opening 28 and slot 30 extend completely through the plug as shown in FIG. 2 to permit the plug to be installed onto the line. After or before installation of the plug onto line 26 a looped portion 34 of a leader 36 is inserted through entrance opening 28 so as to be carried within portion 38 of slot 30, removal of the leader loop portion being prevented by the shoulder 40 defined by entrance opening 28.

Securement of the line and leader in their FIG. 2 retained positions is effected by moving sleeve 12 onto plug 14 in the direction of arrow 42, said movement being operative to cause the sleeve to overlie opening 28 for preventing disengagement of the line and leader from the plug.

It will be noted from FIG. 1 that plug 14 is provided with grooves 44 and 46 for receiving portions of line 26 so as to preclude the line from being tightly squeezed between the opposing plug-sleeve surfaces in such manner as to cause wear, cutting or kneading of the line tending to weaken it. The depth of the grooves may be designed so that some squeezing action is obtained on the line whereby to prevent undesired movement of the plug along the line under the forces encountered in fishing, as for example the pull of the fish on the leader. It may be desirable to let the plug-sleeve assembly have a certain amount of sliding on the line under extreme pull on the leader so as to reduce stress on the line and permit the possible landing of relatively large fish without line breakage. Line breakage is also prevented by the configuration of the plug and sleeve, it being noted that the slot-forming surface 50 on the plug (FIG. 2) is of generally arcuate configuration so as not to present any sharp corners to the line such as would tend to cut it. Also the right end section of sleeve surface 16 is flared at 52 to avoid the presentation of a sharp surface to the line.

A normal pull on line 26 tends to straighten out the looped portion of the line, with a resulting tendency of plug 14 to wedge tighter into the sleeve 12 so as to maintain the plug-sleeve assembly at a fixed position on the line. This feature is of course advantageous in maintaining the fish hook at a desired elevation above the lake bottom over extensive fishing operations.

If desired the frictional locking of plug 14 in the sleeve 12 may be enhanced by initially forming the plug with its shoulder portion 32 projecting slightly out of line from the plug surface 18 as shown in dotted lines at 54 in FIG. 3. The construction is such that during insertion of the sleeve onto the plug the projecting portion 54 is deflected slightly to its FIG. 3 full line position so as to exert resilient clamping force against the internal surface 16 of sleeve. Deflection of portion 54 also serves to move the inner end portion 56 of the shoulder 32 inwardly from its dotted line position to its full line position so as to prevent line 26 from possibly working out of its position within slot 30.

It will be noted that end portion 58 of plug 14 extends a substantial distance beyond the corresponding end of sleeve 12. This relationship is utilized for quick easy separation of the plug and sleeve during leader-removal operations. Thus, to remove the leader from the line-connector assembly the user manually grasps the outer surface of sleeve 12 and forces the end portion 58 onto any convenient surface, as for example the inner side of a boat, or boat seat or boat deck or the like. By lightly striking the end portion 58 against a fixed surface the plug can be quickly made to wholly or partially slip out of the sleeve for exposing the entrance opening 28 so as to permit the leader to be removed from the plug. The sleeve may be retained partially on the plug, with the line 26 held taut against the flaring surface 52 so as to maintain the line in its installed position on the plug-sleeve assembly during the leader-removal operation. In this manner the removal and replacement of leaders is very quickly effected without cumbersome movements on the part of the fisherman.

The embodiment shown in FIGS. 4 and 5 is in many respects similar to that of the FIG. 1 embodiment, and accordingly similar reference numerals are employed wherever applicable.

The FIG. 4 embodiment employs a plug provided with a cylindrical peg 60 for receiving the looped around portion of fish line 26 as shown in FIG. 5, said fish line having portions thereof extending within grooves 62 and 64 formed on the outer longitudinal surfaces of the plug. As in the previously described embodiment, the fish line extends out of sleeve 12 in engagement with the flaring surfaces 52, the arrangement being such that no sharp corners are presented to the line. In this connection the grooves 62 are preferably of graduated depth from their right-end portions toward their left-end portions so as to provide curved surfaces similar to the aforementioned surfaces 50 in the FIG. 2 embodiment.

The plug of the FIG. 4 structure is provided with the narrow entrance opening 66 leading to a slot 68 which accommodates the looped portion of a leader (not shown), said leader having portions thereof received in grooves 70 formed on the outer longitudinal surfaces of the plug.

The FIG. 4 embodiment is generally similar in operation to the FIG. 2 embodiment, it being noted in this connection that sleeve 12 may be slid off of the plug so as to expose opening 66 and permit removal of the leader while the fish line is retained on the peg portion 60 of the plug. The construction and operation is such that leader-removal operations are quickly and easily made.

The devices of the present invention may be made in any convenient size, but the constructional design is such that the devices may be conveniently made in very small sizes, as for example in sizes wherein the assembly has a total length less than one inch. Such a small sized construction of course economizes on materials and thereby contributes to the attainment of a low-cost competitive product. Constructional features may be varied considerably in detail without departing from the spirit of the invention as defined in the accompanying claims.

We claim:
1. A fishline-leader connector comprising a single unitary sleeve and plug removably disposed therewithin so as to be completely separated therefrom by an axial movement; said plug having at least a portion of its side surface located between the sleeve ends in wedged engagement with the sleeve internal surface when the plug is located within the sleeve; said plug having a longitudinal through slot terminating short of the plug ends, and a narrow entrance passageway extending from the aforementioned side surface portion into communication with said slot at a point remote from one of the slot end areas, whereby to define a shoulder adjacent thereto so that when the plug is removed from the sleeve a looped portion of a leader may be extended through the narrow entrance passageway and occupy the above mentioned slot end area; said plug including a projecting wall structure adjacent the other end area of the longitudinal slot so that when the plug is removed from the sleeve a portion of a fishline may be inserted through the narrow entrance passageway and occupy the other slot end area, with the projecting wall structure precluding direct movement of the fishline portion out of its position in the slot; the location of the entrance passageway and through slot being such that when the plug is inserted into the sleeve the leader may extend out of one of the sleeve ends and the fishline may extend out of the other sleeve end, with any pull on the line tending to further wedge the plug into the sleeve.

2. The combination of claim 1 wherein the passageway and slot cooperate to define a generally T-shaped cavity, with the aforementioned shoulder and projecting wall structure being opposed to one another to form the vertical portion of the T.

3. The combination of claim 2 wherein the projecting wall structure comprises a pin extending longitudinally and internally of the plug, whereby a portion of the fishline may be looped about the pin to have a frictional contact therewith.

References Cited in the file of this patent

UNITED STATES PATENTS

| | | |
|---|---|---|
| 332,573 | Tufts | Dec. 15, 1885 |
| 575,674 | Woodward | Jan. 19, 1897 |
| 1,418,944 | Lower | June 6, 1922 |
| 2,504,241 | Wulff | Apr. 18, 1950 |
| 2,570,293 | Vadnais | Oct. 9, 1951 |
| 2,729,014 | Johnson | Jan. 3, 1956 |
| 2,881,552 | Miller | Apr. 14, 1959 |
| 2,890,510 | Spaulding | June 16, 1959 |

FOREIGN PATENTS

| | | |
|---|---|---|
| 694,725 | France | Sept. 22, 1930 |